(12) United States Patent
Sparks

(10) Patent No.: US 11,125,621 B2
(45) Date of Patent: Sep. 21, 2021

(54) METHOD AND SYSTEM FOR POLARIMETRY USING STATIC GEOMETRIC POLARIZATION MANIPULATION

(71) Applicant: SETI INSTITUTE, Mountain View, CA (US)

(72) Inventor: William B. Sparks, Hampstead, MD (US)

(73) Assignee: SETI INSTITUTE, Mountain View, CA (US)

( * ) Notice: Subject to any disclaimer, the term of this patent is extended or adjusted under 35 U.S.C. 154(b) by 0 days.

(21) Appl. No.: 16/678,194

(22) Filed: Nov. 8, 2019

(65) Prior Publication Data

US 2020/0149966 A1  May 14, 2020

Related U.S. Application Data

(60) Provisional application No. 62/757,551, filed on Nov. 8, 2018.

(51) Int. Cl.
| | |
|---|---|
| *G01J 3/447* | (2006.01) |
| *G02B 5/30* | (2006.01) |
| *G01J 4/04* | (2006.01) |
| *G01J 3/02* | (2006.01) |

(52) U.S. Cl.
CPC .......... *G01J 3/447* (2013.01); *G01J 4/04* (2013.01); *G02B 5/3083* (2013.01); *G01J 3/0208* (2013.01)

(58) Field of Classification Search
CPC ...... G01J 3/02; G01J 3/447; G01J 3/18; G01J 3/42; G01N 21/211

USPC ........................................................ 356/327
See application file for complete search history.

(56) References Cited

U.S. PATENT DOCUMENTS

| | | | |
|---|---|---|---|
| 3,183,763 A | 5/1965 | Koester | |
| 2004/0150818 A1* | 8/2004 | Armstrong | B82Y 20/00 356/301 |
| 2008/0319286 A1* | 12/2008 | Ridder | G01N 21/49 600/310 |

(Continued)

FOREIGN PATENT DOCUMENTS

WO  WO-2014/060466 A1  4/2014

OTHER PUBLICATIONS

International Search Report and Written Opinion of the ISA in PCT/US2019/060506, dated Jan. 27, 2020; 6 pgs.

*Primary Examiner* — Md M Rahman
(74) *Attorney, Agent, or Firm* — Goodwin Procter LLP

(57) ABSTRACT

Embodiments of a system and a method for polarimetry using static geometric manipulation of the state of polarization are disclosed. According to one embodiment, a spectropolarimeter comprises a retarder having a geometrically changing fast axis. The fast axis changes along a polarimetric dimension. The spectropolarimeter has a polarization analyzer and a spectrographic optical platform. The spectrographic optical platform has a slit in a spatial dimension same as the polarimetric dimension of the retarder; a collimator; a dispersing element for dispersing spectral components of light received from the collimator along a spectral dimension that is perpendicular to the spatial dimension of the slit; a focusing optic; and a two-dimensional detector array. Using a quarter wave retarder full Stokes polarimetry can be provided though a half wave retarder can also be used.

14 Claims, 8 Drawing Sheets

(56) References Cited

U.S. PATENT DOCUMENTS

| | | | |
|---|---|---|---|
| 2009/0003764 A1* | 1/2009 | Ridder | G01N 21/4795 |
| | | | 385/14 |
| 2012/0176622 A1 | 7/2012 | Kudenov | |
| 2012/0212812 A1* | 8/2012 | Weber | G03B 21/604 |
| | | | 359/454 |
| 2013/0063722 A1 | 3/2013 | Sparks | |
| 2014/0226158 A1* | 8/2014 | Trainer | G01J 3/0218 |
| | | | 356/336 |
| 2018/0106677 A1 | 4/2018 | Telesco et al. | |
| 2018/0280723 A1* | 10/2018 | Enwemeka | A23L 3/26 |
| 2019/0186990 A1* | 6/2019 | Oana | G01J 3/0256 |
| 2019/0374092 A1* | 12/2019 | Wu | A61B 1/00096 |

* cited by examiner

METHOD AND SYSTEM FOR POLARIMETRY USING STATIC GEOMETRIC POLARIZATION MANIPULATION

CROSS-REFERENCE TO RELATED APPLICATIONS

This application claims priority to and benefit of U.S. Provisional Patent Application No. 62/757,551 entitled "Method and System for Polarimetry using Static Geometric Phase Manipulation," filed on Nov. 8, 2018, the entire contents of which are incorporated herein by reference.

FIELD

The present disclosure relates in general to the field of polarimetry, and in particular, to a method and system for polarimetry using static geometric polarization manipulation.

BACKGROUND

Electromagnetic radiation in the form of light is characterized by various properties including intensity, direction of propagation, frequency or wavelength spectrum, and polarization. Analysis of the intensity and spectral characteristics of light is a common diagnostic approach for deducing related properties of the light's source, as well as reflection and transmission mediums between the source and the receiver. Collection and analysis of spectrographic information is a cornerstone approach to astrophysics and has applications in numerous other disciplines such as materials science, remote sensing, medical diagnostics, defense, biophysics, microscopy and fundamental physics. Many astronomical spectrographs use a telescope to focus light from an astronomical source onto a slit. Light from the slit is passed to a collimator which turns the diverging light beam into parallel light, and then to a disperser (usually a reflection grating) to create a spectrum, and then to a camera that focuses the spectrum onto a sensor such as a charge coupled device (CCD). The horizontal axis of the spectral image no longer corresponds to a spatial direction in the sky, but rather now represents wavelength. The vertical axis of the image still corresponds to a spatial position of the incident light source, if the slit is at a focal plane. The result is a two-dimensional, spatially resolved spectrograph image comprising a band of varying intensity stretching across the image in the spectral direction and illustrating intensity as a function of wavelength. The image contains several spectra, each corresponding to a different position in the slit, or more precisely, a different part of the source along the slit.

SUMMARY

Embodiments of a system and a method for polarimetry using static geometric manipulation of the state of polarization are disclosed. According to one embodiment, a spectropolarimeter comprises a retarder having a geometrically changing fast axis. The fast axis changes along a polarimetric dimension. The spectropolarimeter has a polarization analyzer and a spectrographic optical platform. The spectrographic optical platform has a slit in a spatial dimension same as the polarimetric dimension of the retarder; a collimator; a dispersing element for dispersing spectral components of light received from the collimator along a spectral dimension that is perpendicular to the spatial dimension of the slit; a focusing optic; and a two-dimensional detector array.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

Figure 1:
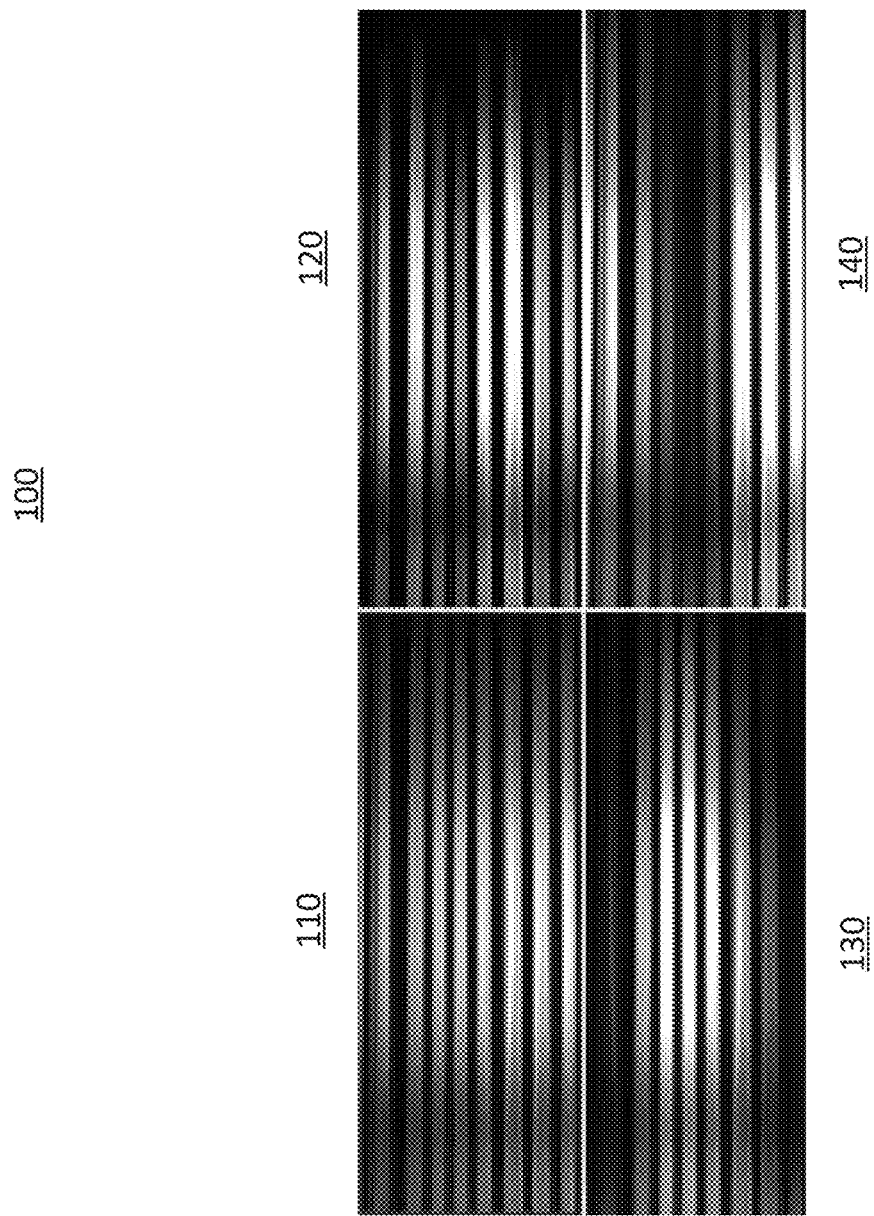
FIG. 1 depicts polarization measurements obtained using an embodiment of a spectropolarimeter for different sources of light.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Embodiments of a system and a method for polarimetry using static geometric manipulation of the state of polarization are disclosed. According to one embodiment, a spectropolarimeter comprises a quarter wave retarder having a geometrically changing fast axis. The fast axis changes direction along a polarimetric dimension. The spectropolarimeter has a polarization analyzer and a spectrographic optical platform. The spectrographic optical platform has a slit in a spatial dimension and a spectrograph is produced along a spectral dimension that is orthogonal to the spatial dimension. The retarder is positioned such that the polarimetric dimension is the same as the spatial dimension, so as to present different states of the polarization retarder and analyzer during generation of the spectrograph. The spectrographic optical platform may also include a collimator; and a dispersing element for dispersing spectral components of light received from the collimator along the spectral dimension that is perpendicular to the spatial dimension of the slit (which is also the polarimetric dimension); a focusing optic; and a two-dimensional detector array.

Polarization is a property of light waves that describes the orientation of their oscillations. "Spectropolarimetry" is the measurement of the polarization of light that has been dispersed into a continuum or line spectrum as a function of wavelength. Spectropolarimetry provides a versatile suite of diagnostics tools. For example, in astrophysical research polarimetry can be used to deduce the properties of astrophysical dust when that dust scatters the light of a nearby star. The starlight becomes polarized when scattered by the dust in a way that depends on the size, porosity and composition of the dust particles. It is possible to measure these characteristics using polarimetry information of the scattered light. Consequently, scientific research based on spectropolarimetry techniques is undergoing a phase of rapid growth, especially in astronomy where spectropolarimetric observations are providing important clues as to planets, stars and the origins of the universe. As with spectroscopy, polarimetry has broad application in pharmaceuticals, medicine, remote sensing and the physical sciences in general.

The polarization characteristic of light can described by the Stokes vector (I, Q, U, V) in which I is the total intensity, Q and U yield the linear polarization in each of two planes at 45 degrees to one another, perpendicular to the direction of wave propagation and, and V is the circular polarization. Normalized Stokes polarization parameters (q, u, and v) represent the fractional polarization state (Q/I, U/I and V/I respectively). Traditionally polarization measurements are made sequentially with polarizing filters at different orientations, with rotatable wave plates, or with complex, fragile, rapidly modulating components such as ferroelectric liquid crystals and resonant crystal photoelastic modulators (PEMs) to achieve high precision. However, sequential measurement entails moving parts, and modulating components typically lead to inherently monochromatic performance and component fragility, all of which introduce mechanical complexity, potential for error, and generally decrease the utility of polarimeters. Indeed, polarimeters employing such schemes are limited in their performance because of the need for sequential measurement, or are too impractical for reliable deployment in a space based astronomical observatory.

In various embodiments, the system can perform Stokes polarimetry without requiring any moving parts. These embodiments are compact and robust, and can encode the full polarization information on a single data frame, based on static geometric manipulation of polarization. In particular, by mapping the rotation of the fast axis of a retarder having a fast axis that changes its orientation to position along a spatial axis, polarimeters according to various embodiments are configured to acquire their data on a single data frame without needing any moving parts.

Some embodiments employ a quarter wave retarder whose fast axis changes in direction with location along one axis of a 2D data frame in conjunction with a polarization analyzer. The full set of Stokes parameters is encoded, with maximal sensitivity to circular polarization Stokes parameter V. The linear and circular polarization terms are encoded with different spatial frequencies, which minimizes or eliminates cross-talk. Other rotating component polarimeters can lend themselves to a similar geometric configuration. For example, if a half wave retarder is used instead of quarter wave, the linear Stokes parameters are encoded. Various embodiments described herein are achromatic in the sense that any particular fast axis direction is essentially constant with respect to the wavelengths and, as such, the polarization modulation spatial frequencies do not change with wavelength. Since the polarimetric information is acquired in a single observation, transient or moving targets are accessible, and the achromaticity lends itself to designs for either spectropolarimetry or polarimetric imaging.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure y repeat reference numerals and/or letters in the various examples. This repetition is for the purpose of simplicity and clarity and does not in itself dictate a relationship between the various embodiments and/or configurations discussed.

The advantages of a polarimeter which provides intensity modulation in this way on a single data frame include: small size; compact, robust design; simplicity and convenience of operation because no moving parts are needed; high dynamic range; and achromaticity. Polarimetry obtained on a single data frame may be applied to the normal suite of polarimetric targets and, in addition, to moving, time varying, or transient sources may also be analyzed.

A retarder, or waveplate, alters the state of polarization of light by exploiting a difference of refractive index with direction. In a conventional waveplate, the optical axis of the waveplate is parallel to the two parallel surfaces of the waveplate, where light is incident in the normal direction upon one of the surfaces. The ordinary axis of the waveplate is perpendicular to the optical axis, and the extraordinary axis of the waveplate is parallel to the optic axis. The indices of refraction along the ordinary and extraordinary axes, $n_o$ and $n_e$, respectively, are different. As such, the respective speeds of the polarization components along the ordinary and extraordinary axes, $v_o=c/n_o$ and $v_e=c/n_e$, respectively, are different. Where $n_o>n_e$, the extraordinary axis is the fast axis because $v_e>v_o$ and the ordinary axis is the slow axis and, where $n_e>n_o$, the ordinary axis is the fast axis because $v_o>v_e$ and the extraordinary axis is the slow axis. Retarders whose fast axis direction changes with location can be made using liquid crystal technologies to impose a pattern on a small spatial scales, or by assembling a waveplate from individual parts each having a different fast axis direction.

A retarder with a spatially varying fast axis or a geometric mask, can be manufactured using a variety of methods, including those employed in vector vortex coronography. With microscale formulation of the polarizing element utilizing UV cured polymers and liquid crystal techniques a mask may be generated in which, for all intents and purposes, the orientation of the fast axis changes continuously with position along one axis of the mask/retarder. As used herein, continuously means the angle of the retarder fast axis changes smoothly with position, and the discrete steps of successive orientations are close enough together to appear continuous.

In the case of the vector vortex coronagraph, the waveplate forming the retarder has a constant retardance, but the fast axis direction changes with azimuth around a central point or singularity. The "charge" m on the mask refers to the number of 180 degree rotations of the fast axis as the azimuth changes through $2\pi$ radians. With similar manufacturing methods, a smooth variation (e.g., less than 10°, 5°, etc.) of the fast axis position angle along a cartesian axis, x or y, is contemplated.

Figure 6:
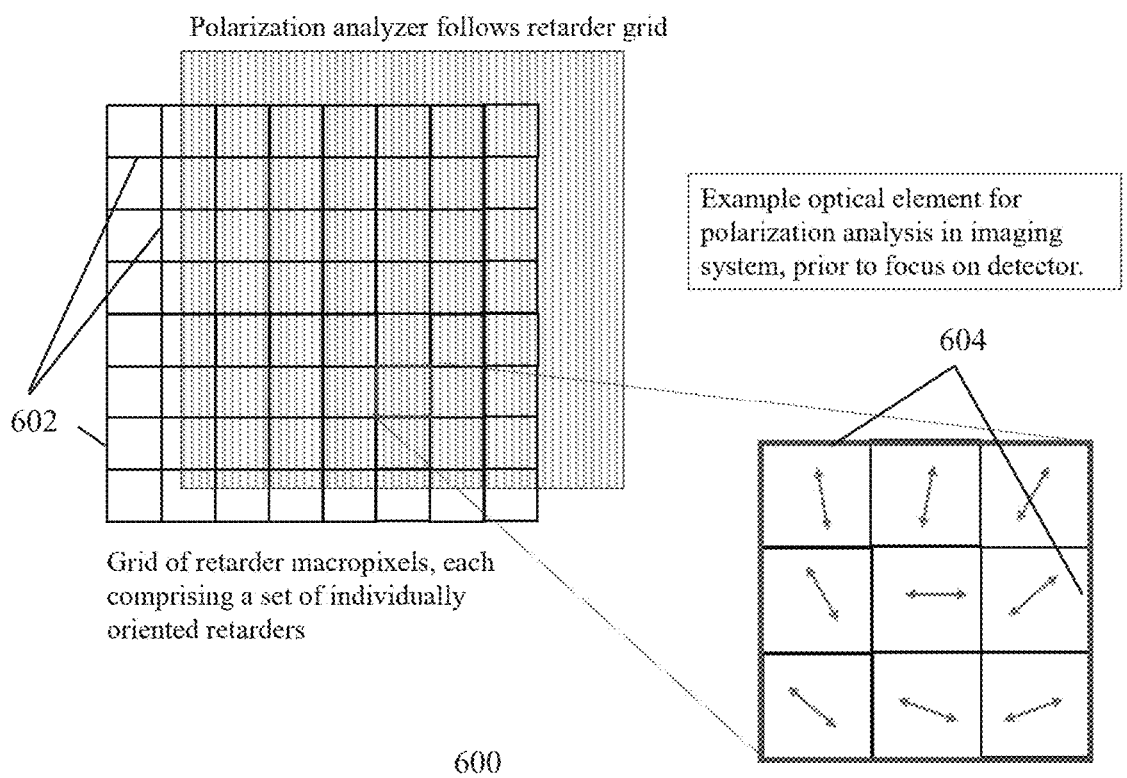
FIG. 6 schematically depicts a geometric polarization mask, according to one embodiment.

With reference to FIG. 6, an embodiment of a spectropolarimeter includes a retarder (e.g., retarder 10) constructed from a set of quarter-wave plate strips from polymer at a set of appropriate fast-axis angles, reoriented so the strips are parallel. The device can function as a full Stokes polarimeter, and can yield high quality results. In one embodiment, retarder 10 includes eight narrow strips somewhat less than 1 mm in width (e.g., within a tolerance of 20%, 10%, 5%, 2%, 1%, 0.5%, 0.1%, etc., relative to a nominal width such as 1 mm) and a few cm in length (e.g., 1, 1.5, 2, 5, cm, etc.), cut from quarter-wave retarder film at position angles corresponding to 22.5 degree increments, from the horizontal, to 157.5 degrees. The strips were cemented to a rectangle of linear sheet polarizer, adjacent to one another, resulting in a fast axis direction which changed with position moving across the strips. Although the retarder assembly 10 was divided and repeated to increase the number of strips presented to the spectrograph, only a single cycle of eight strips was used in the analysis.

It should be understood that while the retarder assembly 10 includes eight strips, retarders having fewer (e.g., 4, 6) and more (e.g., 10, 12, 16, etc.) strips may be used in different embodiments. It should also be understood that depending on the number of strips used, the angle increment or the angle of one strip relative to an adjacent strip can be less than or greater than 22.5 degrees. For example, if 12 strips are used, the change in the angle can be 15 degrees. The retarder assembly 10 may be mounted on a microscope slide, framed by the same materials for support, and protected with a front cover glass microscope slide. A long slit may be fixed behind the mounting slide.

Figure 2:
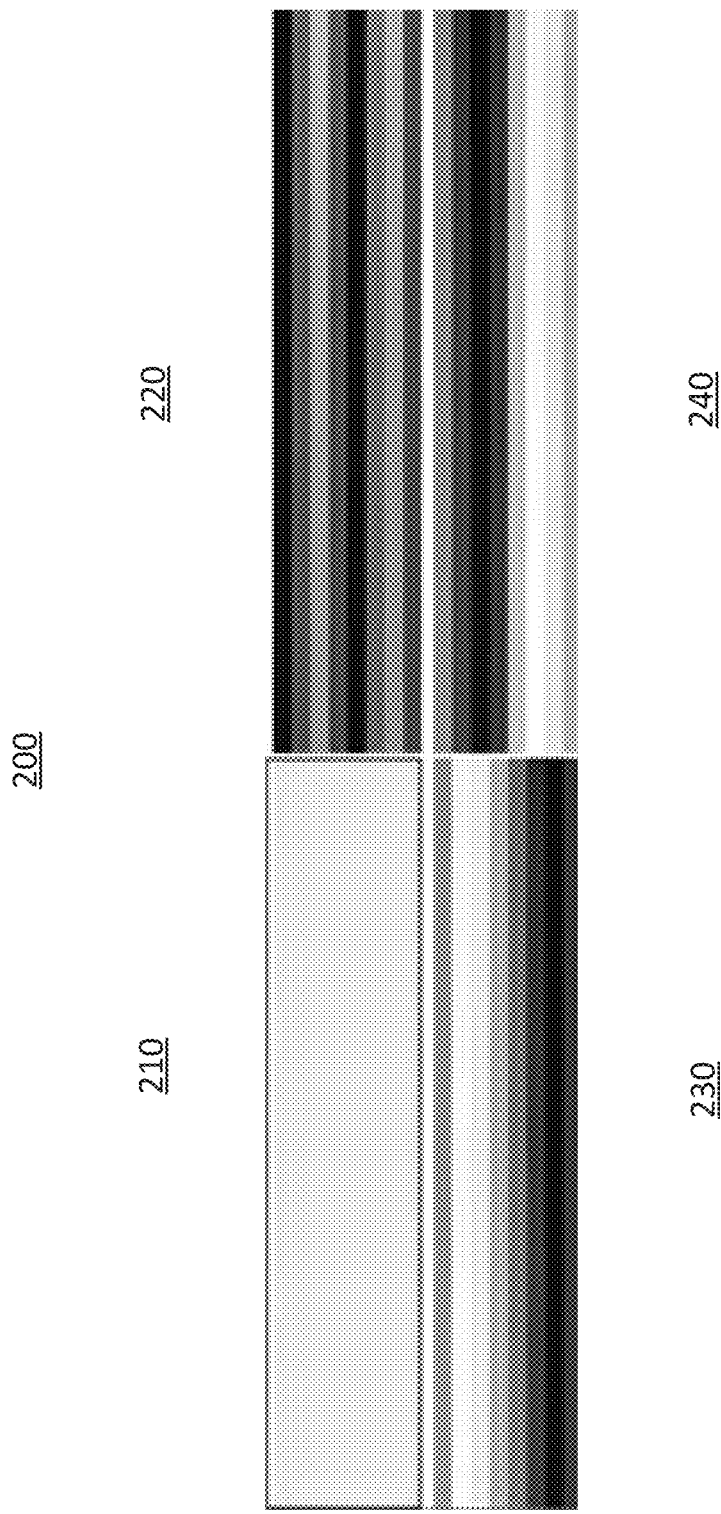
FIG. 2 depicts polarization measurements obtained after preprocessing the raw images using the same embodiment of a spectropolarimeter for the different sources of light used to obtain the measurements shown in FIG. 1.

In one embodiment, a spectropolarimeter includes a retarder having fast axes in several directions and an entrance aperture, a Richardson transmission grating, and a QSI CCD camera. Test exposures were obtained using white light, left and right circularly polarized light from 3D cinema glasses, a cholesteric liquid crystal filter, linearly polarized light, and a maple leaf. The wavelength was approximately calibrated using a 532 nm green laser and 650 nm red laser. FIG. 1 shows the raw data which emerged from the device. The dark gaps correspond to the joins between adjacent strips. FIG. 2 depicts the data of FIG. 1 after preprocessing to remove the gaps and artifacts associated with the joins, hence it is similar to data that would emerge from a mask in which the orientation of the fast axis varies continuously, which shows spectra extracted from the raw data and ratioed to the average white light spectrum. As a device to measure circular polarization, note that (a) the modulation amplitude for V is twice that of Q or U for the same degree of polarization, and (b) since V modulates with half the spatial frequency to the linear terms, there is, in principle, no cross-talk between the two.

Referring again to FIG. 1 the following examples showing four raw data frames are depicted:
  top left frame (110) shows white light, where the wavelength decreases left to right;
  top right frame (120) shows linearly polarized light, where the gaps between the stripes are where the strips adjoin one another;
  lower left frame (130) shows left circularly polarized light; and
  lower right frame (140) shows right circularly polarized light.

FIG. 2 depicts processed spectra segments 200 from the raw data of FIG. 1, which include eight flat-fielded extracted spectra with quarter wave fast axis position angles changing by approximately 22.5° between spectra. The wavelength range is from approximately 590 nm to 670 nm. Upper left frame (210) corresponds to a single white light frame, upper right frame (220) corresponds to linearly polarized light, lower left frame (230) corresponds to left-circularly polarized light, and lower right frame (240) corresponds to right-circularly polarized light. We see twice the spatial frequency for the linearly polarized light relative to the circularly polarized light, and the expected sign change without phase shift between left and right circularly polarized light.

Figure 3:
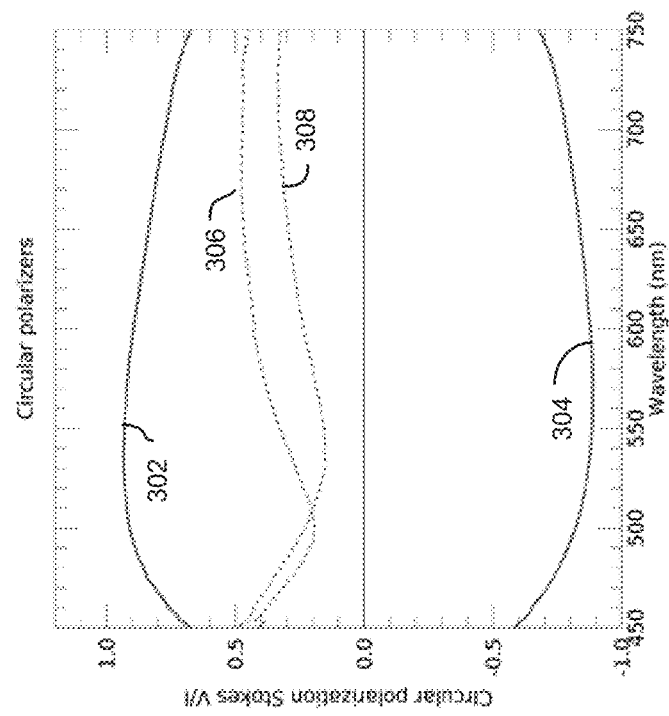
FIG. 3 depicts polarization measurements obtained using an embodiment of a spectropolarimeter for left-circularly and right-circularly polarized light.

FIG. 3 shows the polarization measurements for left and right circularly polarized light obtained by directing the input beam through the left and right lenses of inexpensive 3D cinema glasses. The glasses also reveal a significant amount of expected linear polarization. In particular, FIG. 3. shows the derived polarization for left and right circular polarization light obtained using white light shone through an appropriately oriented pair of 3D cinema glasses. The solid curves 302, 304 represent the circular polarization of the left and right circularly polarized light, respectively. The dotted curves 306, 308 represent the linear polarization for the left and right circularly polarized light, respectively. The left circularly polarized light (curves 302, 306) is associated with the left lens and the right circularly polarized light (curves 304, 308) is associated with the right lens.

Figure 4:
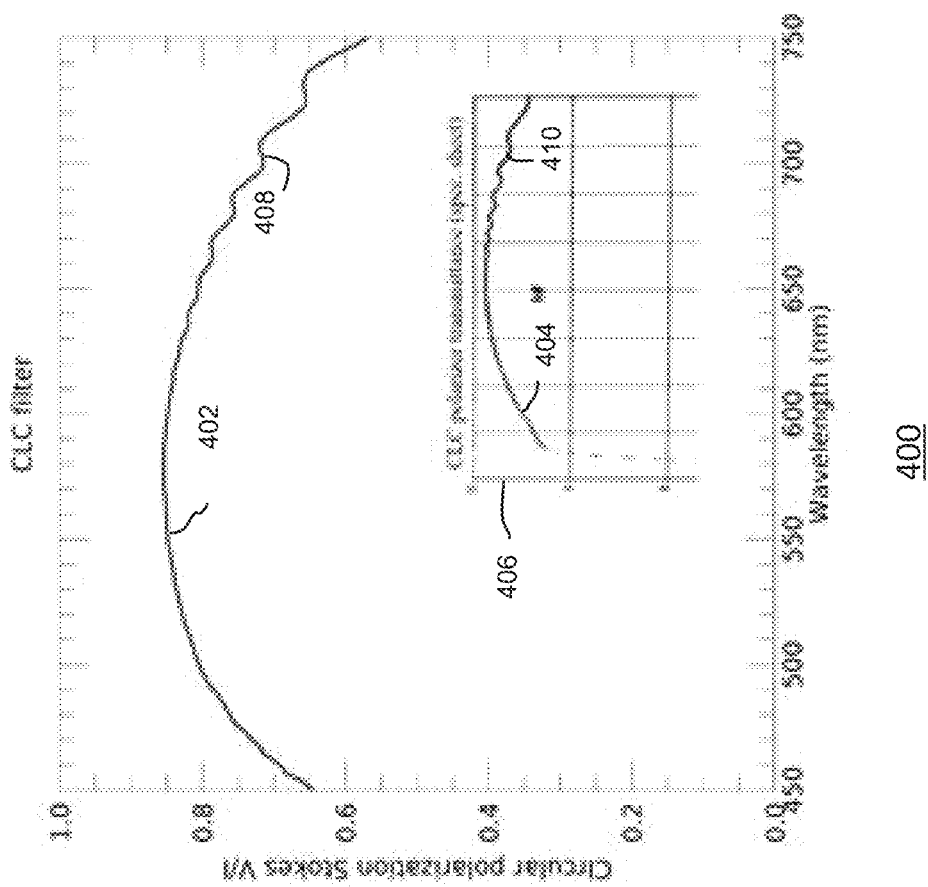
FIG. 4 shows a comparison of a polarization spectrum of circularly polarized light with polarization measurements obtained using an embodiment of a spectropolarimeter.

With reference to FIG. 4, the curve 402 shows the polarization derived in terms of Stokes parameters of electromagnetic radiation passed through a cholesteric liquid crystal circularly polarizing filter. The curve 404 in the inset 406 shows the polarization of the filter as specified by the manufacturer of the filter. Note that the ripples 408 observed in the derived data 402 are also present in the manufacturer-provided curve 404 at 410.

Figure 5:
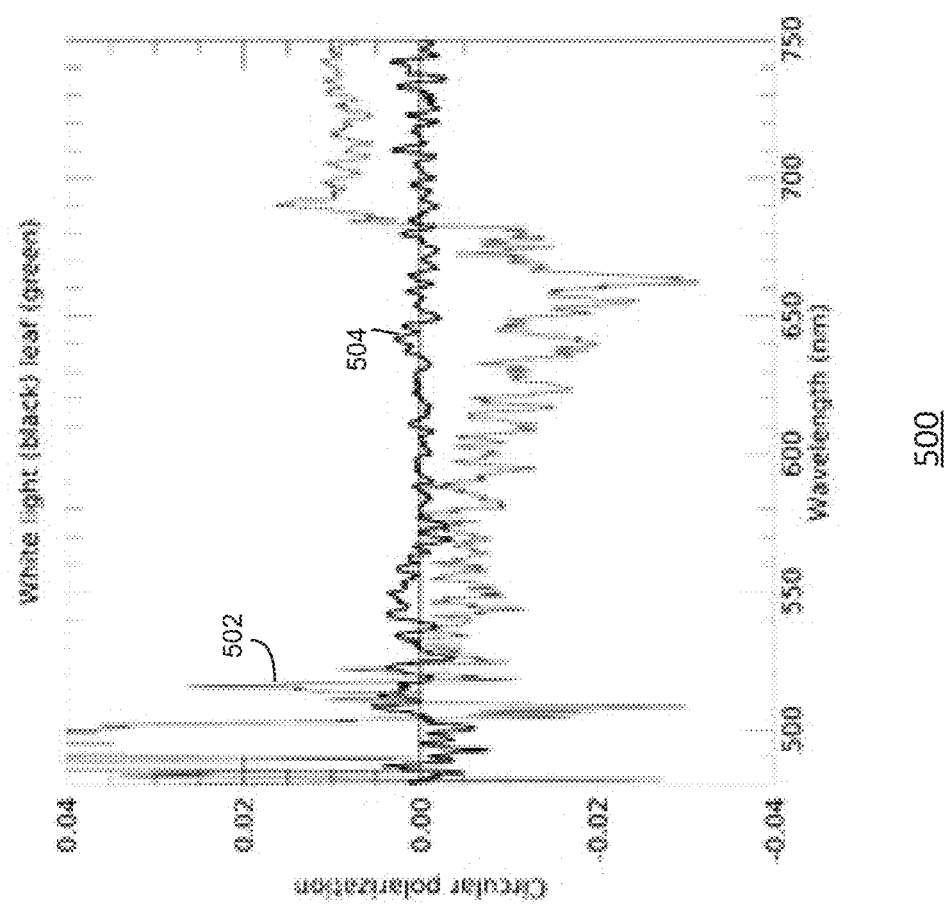
FIG. 5 depicts polarization measurements obtained using an embodiment of a spectropolarimeter for light passing through and polarized by a maple leaf.

With reference to FIG. 5, the curve 502 shows the circular polarization spectrum of light transmitted through a maple leaf. The curve 502 shows the characteristic structure associated with the chlorophyll absorption band at about 670 nm (e.g., between 650 nm and 700 nm). For comparison, the curve 504 shows the analysis for unpolarized white light. The root mean square (RMS) of the latter is 0.19% in Stokes V. The input beam was passed through a maple leaf and a significant level of circular polarization was found with a shape similar to previous measurements of a leaf. The noise level for a single white light frame in Stokes V is less than 0.2%, as can be seen in FIG. 5, indicating a surprisingly high quality performance by the embodiment of the spectropolarimeter used.

One embodiment of a spectropolarimeter may be constructed using geometric polarization mask technology, as follows. A typical detector pixel size is 15 µm; a strip at a particular fast axis angle or orientation may cover, e.g., 4 detector pixels. Thus, a strip approximately 60 µm in length along the slit can provide a 1:1 mapping between the slit and detector, and can be manufactured using the currently available manufacturing technology. To span a cycle using eight angles, repeated twice i.e. charge m=2, the optic would be close to 1 mm in length (0.96 mm to be precise), because 2×8×4×15 µm=0.96 mm. Likewise, an m=4 device would be 2 mm in extent or length along the slit. The equivalent extent on the detector is 64 or 128 pixels, respectively, in the spatial direction.

In general, if each fast axis orientation covers k detector pixels, the number of distinct orientations/angles of the fast axis in one 180° rotation is n, and if the number of 180° rotation is m, the number of pixels in the detector array in the spatial or polarimetric dimension (X) is m×n×k. If the width of each pixel is w, the length of the retarder in the spatial dimension is approximately equal to m×n×k×w. The spatial wavelength and desired coverage in the spatial dimension (X) is a free parameter, completely independent of the spectroscopic configuration in the orthogonal direction (Y), as is the choice of fast axis angles and their sampling, i.e., difference between the angles or orientations of adjacent fast axes. For example if it is necessary to collect a very large number of photons on a single frame to provide precision polarimetry, then spreading the light more extensively may be appropriate. This may also average over detector artifacts and pixel response variations. Furthermore, given the potential compactness of such a device, additional components may be provided along the same slit, such as a rotating half wave plate, or a gap with no polarizing elements at all, etc.

In some embodiments, static encoding of the polarization output can be obtained without using a rotating-fast-axis quarter wave retarder. For example, a conical Fresnel rhomb can be an alternative to the quarter-wave retarder with spatially varying fast-axis direction, yielding a similar polarization modulation on an output circle instead of a straight spatial axis, and can be used together with a fixed position angle analyzer. Progressing around the output circumference of the rhomb, at the (wider) base of the cone, the fast-axis direction remains radial and thus rotates with azimuthal position. The analyzer, meanwhile, is presumed to remain fixed in orientation, hence the net combination produces a similar retarder/analyzer combination discussed above, and a continuous modulation, mapped onto a circle instead of a straight line. The modulated output may be fed to a spectrograph using optical fibers or lenses.

In some embodiments, the polarization analyzer is implemented using crystal optics such as a Wollaston prism, or Savart plate. Use of these components can be more effective when the electromagnetic radiation includes ultra-violet (UV) or infra-red (IR) radiation. Use of a beam splitter to yield a dual beam version of the polarimeter can recover a factor of $\sqrt{2}$ in the signal to noise ratio. A geometric polarization mask can also be made using sheet polymer assemblies, where the fast axis orientation in each strip is adjusted by machine tooling. Thus, using these inexpensive materials, it is feasible to assemble a very large number of spectropolarimeter devices at very low cost, where the devices may offer full Stokes polarimetry or linear polarimetry.

Geometric polarization masks can mimic the rotation of a retarder. Liquid crystal technology can produce a photo-cured variable analyzer position angle, equivalent to rotation. Given these two together, several combinations can be configured to yield data on a single data frame with no moving parts. These combinations include: rotating analyzer; rotating analyzer plus fixed analyzer; rotating retarder plus fixed analyzer; rotating retarder and rotating analyzer; rotating retarder and analyzer plus fixed analyzer, etc. In some embodiments, static half wave plate with changing fast axis position angle can be used to eliminate linear polarization in measurements of the circular polarization of a target, where the spectropolarimeter would provide not all but some of the Stoke parameters.

Given the achromaticity of the fringes which depend not on retardance but on fast axis direction, the techniques described above can be applied to imaging polarimetry. In general, polarization modulation is not "washed out" by a retardance dependence on wavelength. A push broom imaginer can be constructed with a space dimension replacing the spectral dimension, using suitable optics to spread the light orthogonally to the input spatial slit. In some embodiments, a pixelated imaging device with a resolution of 2×2=4, or 3×3=9 pixels in a focal plane, either intermediate or at the detector, encodes full Stokes or linear polarimetry, and can be used with a broad or a narrow band filter. In particular, using geometric polarization mask technology, some embodiments feature a pixelated optic, such as a pixelated quarter wave retarder affixed to a linear polarizer. The four or nine pixel blocks can encode all four Stokes parameters with different quarter wave fast axis position angles, as shown in FIG. 6. Specifically, the retarder 600 shown in FIG. 6 includes a number of retarder macropixels 602 arranged in a grid or an array. Each macropixel 602 includes a set of nine individually oriented retarders 604.

By mapping the time dimension of a rotating fast axis retarder based polarimeter onto the spatial dimension using geometric polarization mask techniques, or simply by assembling such a device macroscopically, the classical approach to polarimetry and spectropolarimetry is reconfigured to acquire data with a single two dimensional data frame. The advantages of this technique include a compact design, robustness, increased fidelity for time variable or moving targets, and reduced complexity and/or cost of design and/or manufacturing, as the device does not include any moving parts. Embodiments featuring a changing fast axis quarter wave plate retarder can be effective in measuring the circular polarization of a target, which may have application in remote life sensing, since it uses two different carrier frequencies for circular and linear polarization.

Figure 7:
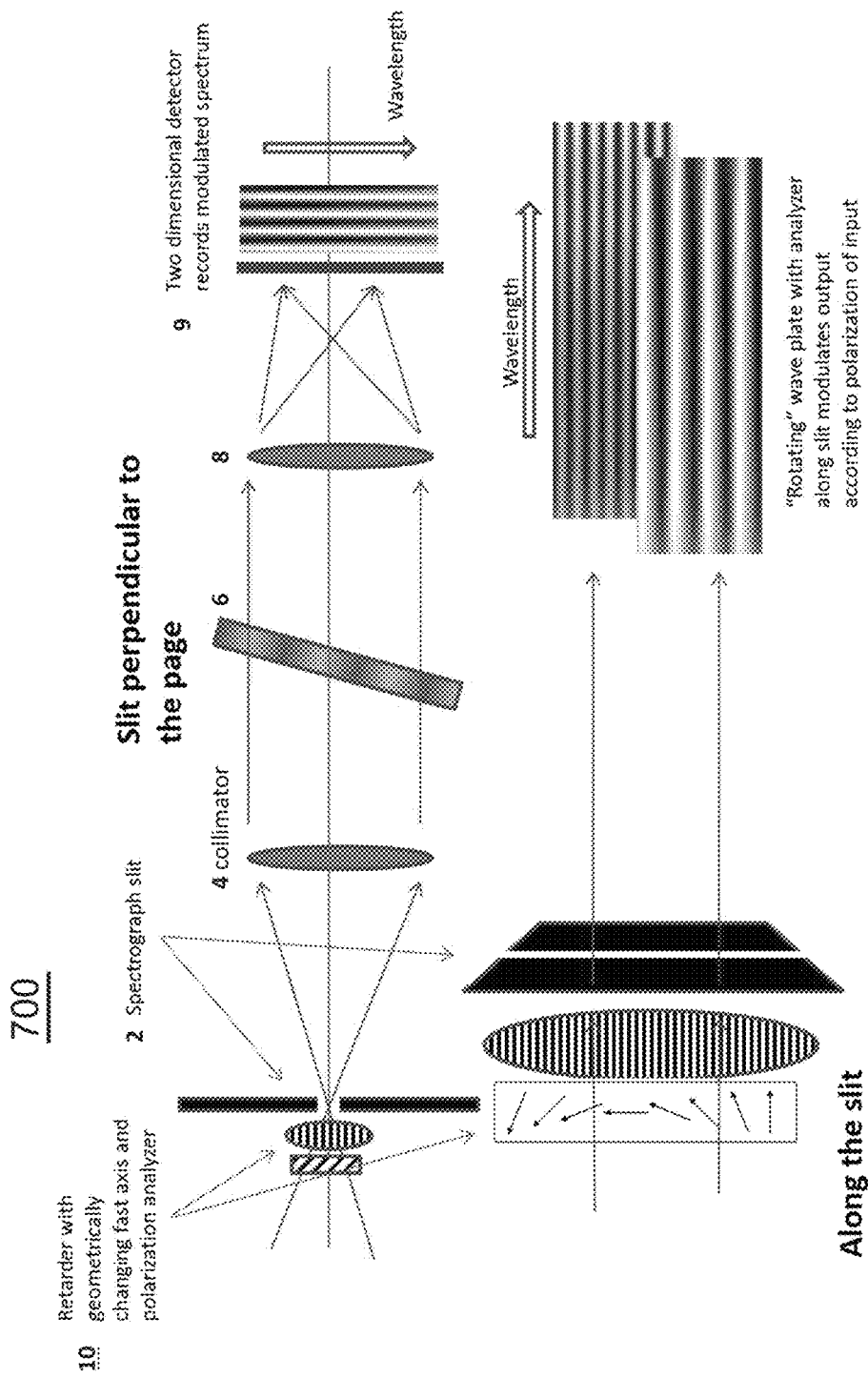
FIG. 7 schematically depicts the components and arrangement thereof of a spectropolarimeter, according to one embodiment.

With reference to FIG. 7, a spectropolarimeter 700 according to one embodiment includes a slit 2, a collimator 4, a dispersing element 6, a focusing optic 8, and a two-dimensional detector array 9. In addition, the spectropolarimeter includes a retarder 10. Retarder 10 has a geometrically changing fast axis and polarization analyzer, as described above. Light (electromagnetic radiation, in general), e.g., from an astronomical point source or point within an extended source, collected by a telescope is imaged onto a long slit, and enters the slit 2 of the spectropolarimeter. Optics may be used to spread the light along the slit. The light emerging from the slit is collimated at collimator 4, which may be a lens or mirror element. In FIG. 6, the spatial dimension (and the corresponding spatial axis X) of slit 2 are perpendicular to the plane of the page (in the upper half of the diagram), and the spectral dimension (and the corresponding spectral axis Y) are in the plane of the page, perpendicular to the direction of propagation/propagation axis Z.

The light is then dispersed at dispersing element 6 into its component wavelengths. Dispersing element 6 may be a conventional prism or, more commonly in modern spectrometers a diffraction grating. Focusing optic 8 may include one or more lenses for focusing the component-dispersed light onto the two-dimensional surface of detector array 9. Detector array 9 may be a conventional astrophotometer two-dimensional CCD or CMOS rectangular photodetector array with multiple light-sensitive pixels arranged in a rectangular array of rows (parallel to a spatial axis X defined by the straight slit 2) and columns (parallel to the spectral axis Y). The slit 2 is imaged on to the detector array 9 by the spectrograph optics 4, 6, 8. The spectral axis Y of the component-dispersed light is typically oriented perpendicular to the slit 2.

The detector array 9 detects and records the intensity of the incident light at each wavelength. The detector array 9 thus functions as an electronic photon collector. The typical CCD camera used for astronomical applications includes a two-dimensional array of photon detectors in a layer of semi-conducting material that is placed at the focal plane of a telescope in order to collect an image. Each individual detector in the array 9 is referred to as a pixel and utilizes the photoelectric effect in which electrons are liberated and stored in the detector in direct proportion to the number of photons from the source that hit the pixel's detector surface. Each pixel in the detector array 9 thus operates as an electron well that accumulates liberated electrons in proportion to the intensity of the light that falls onto it, i.e., the number of incident photons. The number of electrons that can accumulate in each pixel is referred to as well depth and a typical astronomical CCD has a well depth on the order of $10^5$ electrons.

Because a large number of photons need to be collected for precision polarimetry, e.g., on an order of $10^8$ to measure polarization degree of $10^{-4}$, multiple readouts (i.e. emptying) of the collected electrons from the well in the course of a single observation may be needed. A solution to this problem is to spread the light from the slit 2 outward over more than one well or pixel on the detector 9 surface so that the incident photons are distributed over and collected by a greater number of wells which together have a greater electron capacity. Consequently, multiple wells require fewer readouts and thus less time to accumulate detectably significant numbers of the electrons.

If light entering the slit 2 is polarized and if the direction angle ϕ of the fast axis of the quarter wave retarder changes with position x along the slit 2 of the spectrometer followed by a polarizing filter, then the intensity of the light detected along the spatial axis of the detector array 9 at a given wavelength is modulated as a function of one or more of the polarization parameters, with the spatial coordinate x on the detector mapping onto the fast axis direction angle ϕ at any point along the spectrometer slit.

Given the above-described optical platform, a modulation of light intensity is induced along the slit 2 given by 0.5*Q cos(4ϕ) where ϕ is the angle between the retarder fast axis and polarizing filter transmission axis, or x in detector 9 coordinates and the angles ϕ are presumed known through calculation refined by calibration. With reference to FIG. 2, observe that the intensity of light at a given frequency varies along the spatial axis x according to a trigonometric waveform. The linearly polarized Stokes component U at 45 degrees to the slit 2 is given by 0.5*U sin(4ϕ) in the same manner as the Q component. The circularly polarized component V of incident light however yields an intensity modulation equal to V sin(2ϕ). The intensity modulations of the Q, U and V components are combined on the two dimensional detector array 9 to form a singly-imaged waveform having the constituent elements for a given wavelength of light.

Figure 8:
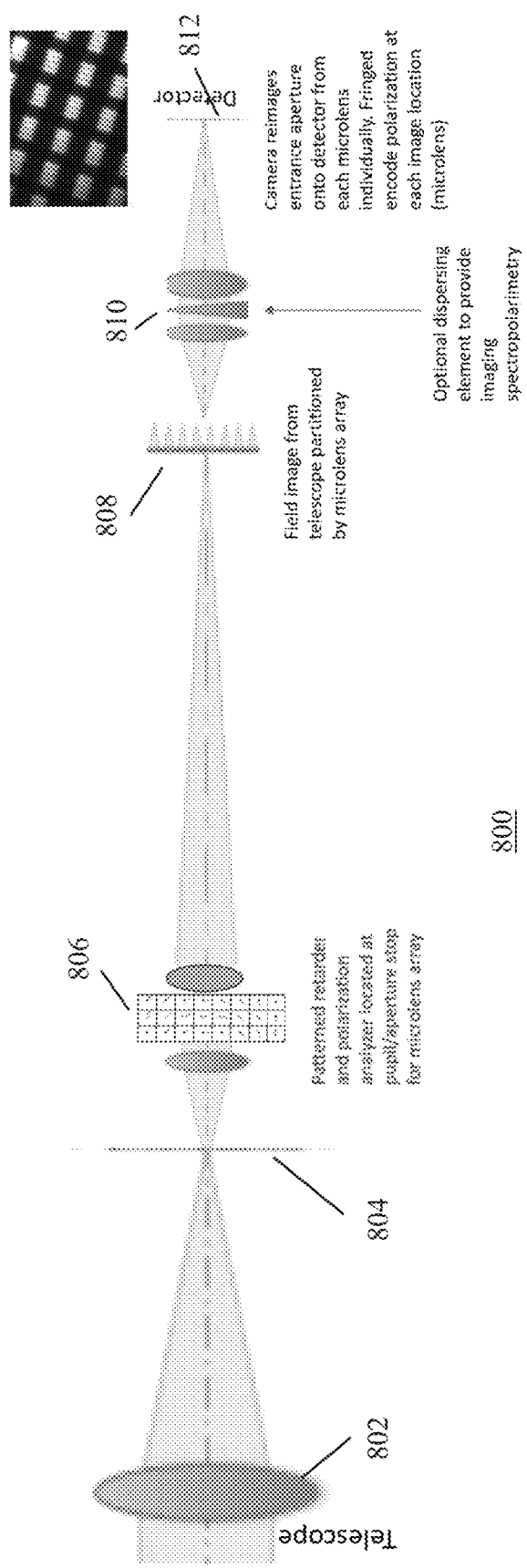
FIG. 8 schematically depicts the components and arrangement thereof of a spectropolarimeter, according to another embodiment.

With reference to FIG. 8, a spectropolarimeter 800 according to one embodiment, a telescope 802 receives light (EMR, in general) and captures an image from a source which is then passed through a slit 804. The light emerging from the slit 804 passes through a single retarder/polarization analysis optic 806. The light emerging therefrom is received at a microlens array 808 which serves to partition the image captured by the telescope 802. A detector camera 812 is used to obtain multiple images of the rectangular entrance slit with its polarization analysis optic 806. Thus, the polarization of light passing through each microlens separately can be obtained. A disperser 810 may be used prior to the detector 812, so that spectrographic polarimetry can be performed.

Muller matrix analysis may be used to derive expressions for the intensity modulation, which now encodes the I, Q, U and V polarization components as linear coefficients of trigonometric functions. Thus, using an array of measured intensities, the corresponding full Stokes parameter set I, Q, U, and V can be computed using a linear least-squares analysis. This is advantageous over various other techniques that encode the polarization information along the spectral dimension (the direction of dispersion perpendicular to the slit), because encoding in the spectral dimension necessitates the use of a Fourier analysis which can be quite unstable in the presence of incomplete waveforms to disentangled spectral structure from polarization modulation.

The above example embodiments have been described herein above to illustrate various embodiments of implementing a single-shot static, geometrically based polarimeter. Various modifications and departures from the disclosed example embodiments will occur to those having ordinary skill in the art. The subject matter that is intended to be within the scope of the present disclosure is set forth in the following claims.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that later filed claims and their equivalents define the scope of the invention.

What is claimed is:

1. A spectropolarimeter comprising:
    a retarder that receives electromagnetic radiation (EMR) having a geometrically changing fast axis, wherein the fast axis changes along a polarimetric dimension;
    a polarization analyzer that receives the EMR from the retarder; and
    a spectrographic optical platform that receives the EMR from the polarization analyzer, the spectrographic optical platform comprising:
        a slit in a spatial dimension same as the polarimetric dimension of the retarder;
        a collimator;
        a dispersing element for dispersing spectral components of light received from the collimator along a spectral dimension that is perpendicular to the spatial dimension of the slit;
        a focusing optic; and
        a two-dimensional detector array that records a plurality of intensities of the EMR representing polarization values of the EMR along the polarimetric and spectral dimensions as a single frame image.

2. The spectropolarimeter of claim 1, wherein the retarder comprises a quarter wave retarder having a fast axis that is microscopically patterned or is varied continuously along a selected axis.

3. The spectropolarimeter of claim 1, wherein the retarder comprises a plurality of quarter-wave plate strips, wherein a fast axis of a first strip is at a selected angle relative to a fast axis of a second strip adjacent the first strip.

4. The spectropolarimeter of claim 1, wherein:
the geometrically changing fast axis is rotated 180° m number of times and each rotation comprises n distinct orientations of the fast axis;
one orientation of the fast axis corresponds to k pixels of the detector array; and
the detector array comprises (x=m×n×k) pixels in the polarimetric dimension.

5. The spectropolarimeter of claim 4, wherein the detector array comprises y pixels in the spectral dimension, x being independent of y.

6. The spectropolarimeter of claim 4, wherein:
width of one pixel is w; and
length of the retarder is approximately y x w.

7. The spectropolarimeter of claim 6, wherein:
the width of one pixel, w, is approximately 15 μm; and
one orientation of the fast axis corresponds to 4 pixels.

8. The spectropolarimeter of claim 1, wherein the retarder comprises a plurality of half-wave plate strips, wherein a fast axis of a first strip is at a selected angle relative to a fast axis of a second strip adjacent the first strip.

9. The spectropolarimeter of claim 1, wherein the retarder comprises a conical Fresnel rhomb.

10. The spectropolarimeter of claim 1, wherein the polarization analyzer comprises a beam splitter, a Wollaston prism, or a Savart plate.

11. A method of performing spectropolarimetry, the method comprising steps of:
receiving electromagnetic radiation (EMR) at a retarder having a geometrically changing fast axis, wherein the fast axis changes along a polarimetric dimension;
passing the EMR emerging from the retarder through a polarization analyzer; and
passing the EMR emerging from the polarization analyzer through a spectrographic optical platform having:
a slit in a spatial dimension same as the polarimetric dimension of the retarder;
a dispersing element for dispersing spectral components of the EMR emerging from the slit along a spectral dimension that is perpendicular to the spatial dimension of the slit; and
a two-dimensional detector array,
wherein the two-dimensional array records a plurality of intensities of the EMR representing polarization values of the EMR along the polarimetric and spectral dimensions as a single frame image.

12. The method of claim 11, further comprising processing the recorded plurality of intensities using a processor, to derive one or more Stokes parameters, using a trigonometric function mapping the plurality of intensities to the one or more Stokes parameters as a function of angle of the fast axis with respect to a spatial axis in the spatial dimension.

13. The method of claim 12, wherein the one or more Stokes parameters include linear polarization parameters denoted Stokes Q and U, and exclude circular polarization parameter denoted Stokes V.

14. The method of claim 12, wherein the one or more Stokes parameters include linear polarization parameters denoted Stokes Q and U, and circular polarization parameter denoted Stokes V.

* * * * *